United States Patent
Vohs

(10) Patent No.: US 11,259,993 B2
(45) Date of Patent: Mar. 1, 2022

(54) FLAVORED TEETHING DEVICES

(71) Applicant: Amy Vohs, Polk City, IA (US)

(72) Inventor: Amy Vohs, Polk City, IA (US)

(73) Assignee: LIL' SIDEKICK, Polk City, IA (US)

(*) Notice: Subject to any disclaimer, the term of this patent is extended or adjusted under 35 U.S.C. 154(b) by 0 days.

(21) Appl. No.: 16/161,365

(22) Filed: Oct. 16, 2018

(65) Prior Publication Data

US 2019/0110959 A1    Apr. 18, 2019

Related U.S. Application Data

(60) Provisional application No. 62/572,696, filed on Oct. 16, 2017.

(51) Int. Cl.
| | |
|---|---|
| *A61J 17/00* | (2006.01) |
| *A23G 4/00* | (2006.01) |
| *A61J 17/02* | (2006.01) |

(52) U.S. Cl.
CPC .............. *A61J 17/101* (2020.05); *A23G 4/00* (2013.01); *A61J 17/02* (2013.01)

(58) Field of Classification Search
CPC ...................................................... A61J 17/02
See application file for complete search history.

(56) References Cited

U.S. PATENT DOCUMENTS

| | | | | |
|---|---|---|---|---|
| 4,761,437 A | * | 8/1988 | Christie | A61K 8/8135 523/102 |
| 6,334,974 B1 | * | 1/2002 | Chen | B29C 45/0001 264/328.18 |
| 2012/0004303 A1 | * | 1/2012 | Benson | A61K 9/006 514/535 |
| 2015/0157434 A1 | * | 6/2015 | Bardach | A61C 19/063 433/217.1 |

* cited by examiner

*Primary Examiner* — Michael F Pepitone
(74) *Attorney, Agent, or Firm* — David M. Breiner; BrownWinick Law Firm

(57) ABSTRACT

The present invention comprises a new material used to form semi-rigid shapes. The new material comprises a specific blend of materials and a method of making the blend pertaining to temperatures and conditions. Items made of or comprising the new material in accordance with the invention will exhibit both suitable rigidity and durability along with long-lasting flavor to be used in the construction of a number of items, including teething devices, drinking cups, drinking straws and other utensils. The material itself and the inventive devices may be used to flavor other foods. For example, a teething device made from the flavor infused material encourages the child to use the device for longer periods, thereby providing better relief than prior art teethers. Flavored straws may be employed to add, or provided to blend, the flavor of the straw with the flavor of the liquid pulled through the straw. The flavor character is expected to last a minimum of 6 months and typically at least to 2 years or more.

5 Claims, 1 Drawing Sheet

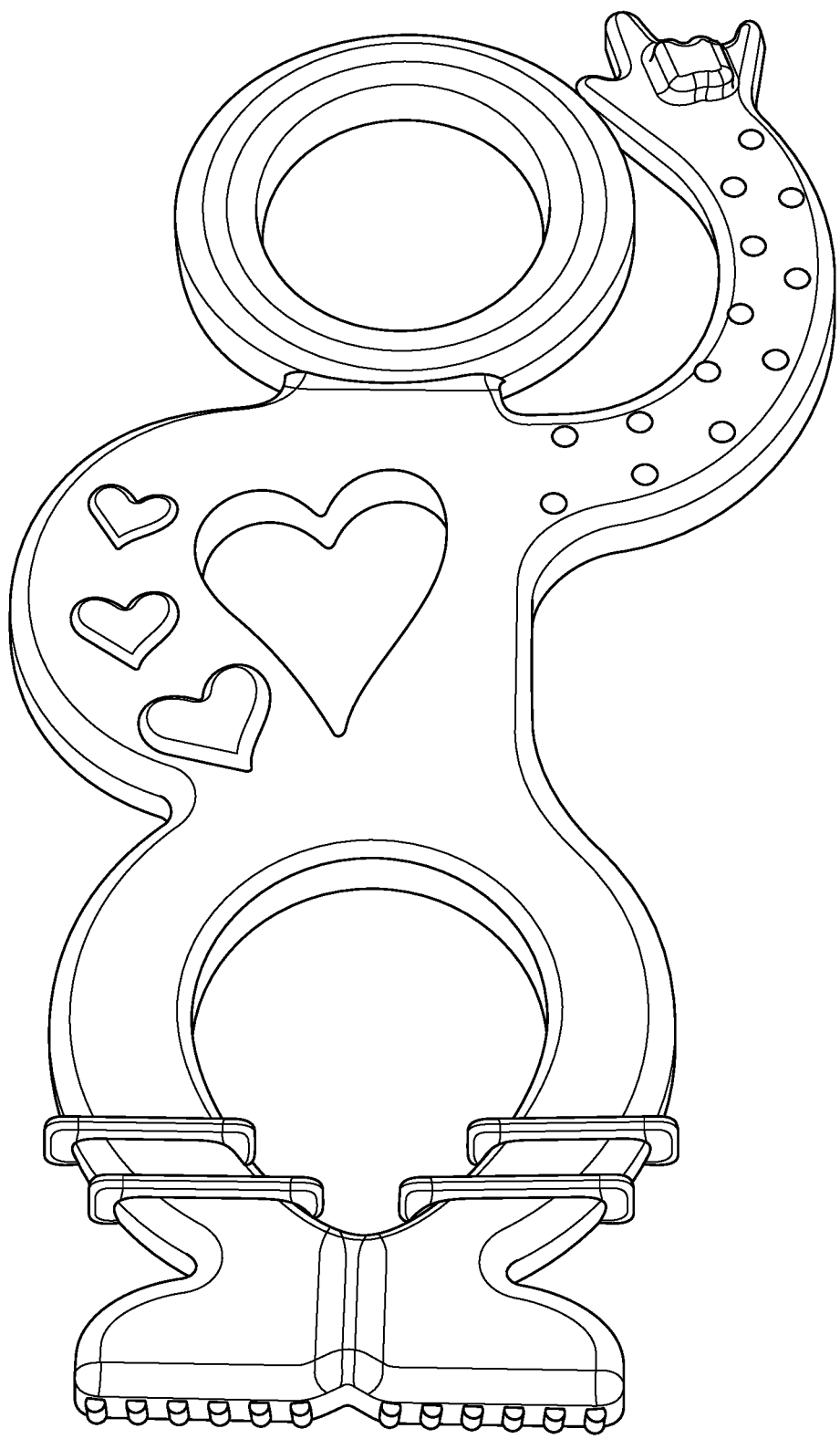

FLAVORED TEETHING DEVICES

CROSS REFERENCE TO RELATED APPLICATION

This application claims priority to U.S. Provisional Application No. 62/572,696 which was filed on Oct. 16, 2017, the entirety of which is incorporated herein fully by reference.

SUMMARY

Prior art devices such as teething devices, straws, sippy cups and mouth guards, to name but a few, are often comprised of plastic. The texture of the plastic can be devised to be especially useful to relieve gum pain for a teething child yet durable and easy to clean. Plastic teethers can be shaped into appropriate shapes and colors that are attractive to teething children, yet safe to use and easy to keep clean. But, they taste and smell like plastic and, therefore, the user often chooses not to use the device or tolerates the plastic taste and smell only temporarily. Sippy cups and straws, as well as mouth guards used for teeth straightening, to treat sleep disorders, and to protect athletes' mouths suffer the same issues. And there are other items such as drinking cups, drinking straws, and eating utensils often also made of plastics, some of a flexible nature, some more rigid, but many exhibiting a plastic chemical taste, unpleasing to the user.

Prior art plastic materials have been devised that include scent. Examples include certain devices intended to impart scent into its surroundings such as air freshening devices for cars. Scented plastic has also been employed in various toys, as well. Of course, a scent may trigger an expectation of taste, but such scented plastics do not actually exhibit taste. Therefore, while employing a scented plastic in a teething device may entice a child to put the device in his mouth, the child is likely to become frustrated with the lack of taste and unlikely to continue use when no sensation of taste occurs.

There is a need for a material that exhibits not only scent but also taste. The desired material would exhibit flexibility or rigidity at room temperature and also provide both scent and taste to the user of utensils made from or partly of such material, including lasting, durable taste throughout the material.

The present invention comprises a new, flavored material. The material comprises a nontoxic material exhibiting a desired level of impact resistance, pliability, and flexibility while being resistant to tearing, breaking, and puncturing.

The present invention comprises a material resulting from the employment of flavor-infused plastic beads. The plastic is, desirably, nontoxic and of low melting point. It provides high resiliency and is both puncture and impact resistant, flexible and pliable when shaped into a device. The material is desirably flavored employing nontoxic, non-artificial sweeteners or flavors. The plastic material may comprise, for example, a vinyl material.

The present invention comprises a new teething device. The device is intended for easing the discomfort of teething in babies and toddlers with emerging teeth that have not yet fully erupted through the gum. Teething devices made in accordance with this invention provide more enticement to the child to use it.

Other utensils such as cups, straws, and eating tools such as forks, knives and spoons may be made of the inventive material employing the novel process described herein. Specifically, the present invention comprises a method for safely infusing a non-toxic plastic with a on-artificial flavor and shaping it into a teething device. Generally, a similar process or method may be employed to produce drinking cups or glasses, pacifiers, plates, straws or any other utensil or device where taste may enhance the use of the device or encourage the use of the device. Preferably, the taste infused into the present material and inventive teethers, straws, cups and other utensils is long lasting.

The device resulting from the method and material described herein does not need to be chilled, does not create its own mess by melting or disintegrating, requires no refrigeration, and may be used multiple times. Due to the infusion of flavor, the teether, pacifier, cup, straw, plate, bowl, spoon, or other utensil retains its flavor over a relatively long period of time, dependent upon the level of use, and when employed in a teething device, results in better compliance and longer periods of relief for the teething child (and relief for the parents, as well).

In addition, the inventive material may act as a flavoring device, imparting flavor to liquid or other material with which the device comes in contact. In this manner, users of the device may be encouraged to drink more water, for example. Or the flavor of the device may be specifically chosen, e g., choosing a strawberry flavored drinking glass in which a regular margarita is poured will produce a strawberry flavored margarita. The possibilities for uses of the flavored utensils are many, whether in the baby and toddler markets, or not.

BRIEF DESCRIPTION OF THE DRAWINGS

FIG. 1 shows a teething device of the present invention

DETAILED DESCRIPTION OF THE INVENTION

There are presently sold flavoring material for the purpose of adding or blending flavors to drinks, candies, and foods. However, most of these flavorings are temporary in that they do not adequately adhere to the material to provide lasting flavor or are easily vaporized from the material. Further, processes for making, e.g., teethers, drinking cups and other plastics almost always include heating plastics in order to form the intended item. The level of heat required to make, form, or cure the item is typically high enough to destroy or "turn" the flavor thereby resulting in a material without flavor or with unacceptable flavor.

The present invention comprises a flavored plastic and a method of using the flavored plastic to produce a flavored teether or other flavored device or utensil. The preferred embodiment comprises a flavored plastic that includes no chemicals and no artificial sweeteners. The preferred method comprises the creation of a flavor mixture comprising no chemicals or artificial sweeteners but, instead, only natural flavors. The source of flavor may comprise a flavor powder, flavor extracts, flavor paste, flavor granules, a flavor oil, e.g., apricot oil, alone or in combination. The properties of the sweetener are preferred to include: 1) little or no sensitivity to heat (at least at the temperatures and time required to perform the process of making the intended device); 2) non-sugar compositions or pure sweetener substances or mixtures of the same; and 3) adequate oil solubility. An example of an acceptable sweetener is stevia.

Stevia is a plant native to South America, used as a non-nutritive sweetener containing little or no calories. It is now grown in many countries. Stevia is 200-300 times sweeter than table sugar yet does not contribute calories or carbohydrates to the diet, has no effect on blood glucose or insulin response. It can, therefore, be used by those with diabetes. It contains sterols and antioxidant compounds, including kampferol. Further certain glycosides in stevia extract have been found to dilate blood vessels, increase sodium excretion and urine output and my help lower blood pressure. Further, the use of stevia can reduce the calories from other sweeteners typically present in the diets of children. Finally, studies have shown that steviol glycosides are not reactive and are not metabolized to reactive compounds. The European Food Safety Committee concluded that even highly purified forms of stevia extract are highly unlikely to cause an allergic reaction. In fact, Medical News Today reported that an allergic reaction to stevia had not been recorded since 2008. "What is Stivia?" by Hannah Nichols, Jan. 4, 2018, Medical News Today.

Formation of the flavor mixture is followed by combining the mixture with heated plastic beads in a tumbling device (or combining with unheated plastic beads in a heated tumbling devise, or employing both heated beads and a heated tumbling device, or combining unheated beads and an unheated device, thereafter, warming the combination together) resulting in plastic beads that are a mixture of beads that are either infused or coated with the flavor mixture. Therefore, the flavor and its intensity can both be precisely controlled. The intensity of the flavor of the mixture overall can be reduced by combining with non-flavored beads before formation of the plastic into the shape of the device.

The beads may comprise, for example, EVA (poly (ethylene-vinyl acetate) or ELVAX polypropylene, or HDPE or similar materials having similar properties and classified as nontoxic. Ethylene-vinyl acetate (EVA), also known as poly (ethylene-vinyl acetate) (PEVA), is the copolymer of ethylene and vinyl acetate. According to Wikipedia, the weight percent vinyl acetate usually varies from 10% to 40%, with the remainder being ethylene. The variation in weight percent of vinyl dictates the properties of EVA copolymer. Generally, EVA is an elastomeric polymer and produces materials which are "rubber-like" in softness and flexibility with good clarity and gloss, resistant to stress-cracking and tough in low temperatures. It also exhibits hot-melt adhesive waterproof properties and is resistant to UV damage.

Elvax® (provided by DuPont) is an example of an ethylene vinyl acetate copolymer resins that exhibits adequate durability, toughness and flexibility to be employed for the purpose of the present invention. Elvax and other EVA exhibits better flexibility than low density polyethylene over a broad temperature range and, therefore, is especially suitable for teethers and other objects.

The aforementioned resins can be processed by injection molding and other conventional thermoplastic methods including structural foam molding, sheet and shape extrusion, blow molding and wire coating. Conventional rubber processing techniques such as Banbury, two-roll milling and compression molding may also be used.

Although EVA has been described as a material that may be used, the invention is not so limited. Other materials exhibiting adequate characteristics pertaining to flexibility, durability, toxicity, and flavor infusion potential may be employed in the present invention. Further, mixtures of such materials may be used or the device may be comprised of portions made of materials disclosed herein, and portions that are not. For example, a spoon may comprise a handle made of material having less flexibility than the bowl of the spoon. The bowl of the spoon may comprise the inventive material disclosed herein.

Although the ratio of beads to flavoring will vary with the intended use of the eventually-flavored device and the intensity desired, one example comprises 100 pounds of EVA beads: 10%-25% of (FLAVOR) by weight. The flavor mixture may comprise, for example, about 8%-10% flavor oil and between 1 and 3% sweetener blend which may include one or more sweeteners such as Stevia, Inulin, or Erthyritol. It will be understood that the flavor oil combination is one made to taste and may be varied according to intended use or intended users. The sweetener blend is then mixed with the beads and tumbled for a little over an hour. Clearly, tumble time is dependent upon temperature, and temperature should be managed relative to the chosen sweetener blend.

Once the flavor infusion process is complete, the flavor-infused plastic beads of the present invention may be employed in a generally known manner that includes heating to melt the beads and then shaping and forming the melted (or at least softened) now-flavored plastic into shapes appropriate for use as teethers or any of the aforementioned utensils or other objects. For example, injection molding techniques work well at temperatures for injection molding at about 275 to about 300 F, however, this statement is not meant to be limiting. Any technique for shaping the liquefied or semi-liquid material at a temperature that does not cause the flavor to be "off" or the material to lack shape definition is acceptable. Once molded the object is allowed to cool into a generally stable shape at room temperature.

Generally, the device comprising the infused non-toxic plastic will exhibit flavor characteristic for a period of between at least 6 months and 2 years and typically longer, depending upon the level (frequency, duration) of use. Typically, the infused non-toxic plastic also is scented due to the flavor content. Tests show that the inventive material and resulting products adequately hold flavor through a 72 hour soak albeit the flavor lessens with time. This test comprises fully submerging the material in water, and tasted at various hour intervals by trained tasters. The device was required to flavor the water in which it was submerged for five minutes, and the device was required to hold its flavor during the 72 hours of soaking. The material of the present invention and objects made of it successfully passed this taste test.

While it is understood that other types of plastic beads may be employed, the inventors have developed their process using ELVAX® plastic beads (made of ethylene vinyl acetate copolymer). This plastic is non-toxic and comprises a relatively low melting temperature of 265° F. It is both resilient and versatile. It resists punctures and impact, yet remains flexible and pliable and is often used in materials for packaging and sealing food products, and used in non-invasive medical tubing. However, other plastics exhibiting some or all of these same general characteristics may be used so long as the plastic meets the non-toxic standard and can be flavored as described herein. Plastic blends may also be employed within the non-toxic limitation.

The inventors experimented with flavor extracts for the purpose of infusing the plastic with flavor. However, while not impossible to use, flavor extracts are not easily used for the purpose of infusing or coating plastic due to their aqueous nature. Further, for flavoring to work, it has to adhere to something. Additionally, many extracts are adversely affected by the temperatures necessary to form the desired utensils. The present invention typically employs oil-based flavoring and a low-melting temperature plastic made to absorb oil-based liquids, however, it is not outside the scope of this invention to consider and employ flavor extracts nor is it out of the inventions' scope to use other types of plastic.

The selection of a low-melting temperature plastic is recommended when employing a natural flavor. Natural flavors are often heat sensitive; using a plastic that melts at lower temperatures reduces or eliminates the detrimental effects of heat on the natural flavor oil or oils that may be used to flavor the plastic. The example plastic, ELVAX® is an example of a suitable plastic but the inventors do not wish to limit their invention to the use of this plastic. Blends of plastics that yield similar characteristics or other plastics that have similar melting and mixing characteristics may be employed so long as the plastic is non-toxic and of adequate flexibility, resistance, and tensile strength to result in a teething device or other utensil that is safe for toddler use. Employing the "toddler standard" as is done here is not meant to limit the invention to use by toddlers. There are myriad applications for flavoring adult or children's beverages as well.

The method for making the teething device of the present invention begins by infusing and/or coating non-toxic plastic beads with a non-artificial sweetener or sweetening mixture. An example mixture may comprise coconut oil, apricot oil, flavoring powder, and a small amount of a sugarless sweetener, e.g. Crystal Light, powdered lemonade, limeade, Stevia, or other powdered drink mixes work well. Powdered sugar may also be an option in an embodiment where a low sugar content may be allowed. Other sweet flavored oils may be employed. Further, flavors such as chocolate, caramel and marshmallow flavors may also be employed. The amount of flavoring varies with the flavor and with the desired intensity, but almost always is used as less than 20% of the material. In general, the relative proportions, by weight, of the sweetening mixture components might be about 4 fruit powder: around 16 fruit oil: 1-2 powdered drink mix: 100 plastic beads. Of course, this mixture may be varied according to the specific fruit flavor employed and its strength, as well as in accordance with the intensity of the fruit's flavor and that of the non-artificial sweetener employed, and the flavor intensity desired to be achieved.

The infusion process comprises heating the plastic enough to soften the plastic. It is not necessary to melt the plastic beads to a liquefied state in order to infuse the flavor; softening is enough to allow the bead to absorb or adsorb the flavor. The softened beads allow the flavor to penetrate and attach adequately to the beads. As an example, beads may be warmed for about an hour at temperature of between about 125 and about 135 F thereafter adding the desired amount of flavor. The flavor and beads remain in contact to foster infusion of flavor into the beads. Generally, tumbling the warm beads and flavoring together is recommended for even application.

The plastic beads in one embodiment are loaded between about 20% and 25% per volume of plastic, depending on the inherent intensity of the flavor and/or the desired intensity of the flavor in the resulting teething toy or other utensil. The beads and flavor are tumbled together, with heat, to provide time and contact necessary to allow the flavor to coat and at least partially infuse into the softened plastic; a tumbling or rolling action is then employed while the beads cool for the purpose of retaining a free-flowing, beaded material much like its original form, for ease of measuring, packaging, transport, etc. This may be accomplished using a ribbon blender, however, other adequate mixing means are also available. These flavor-infused beads may then be stored until they are needed for production.

To make a device or utensil of the present invention, the infused or coated non-toxic beads are subjected to a relatively standard process that includes adding enough heat to allow the flavored beads to become malleable enough to be shaped into an object of suitable size and shape for the desired or intended use. One example process temperature for melting and molding the plastic is 350 F, however, other temperatures may be employed so long as the natural flavor is not noticeably altered by heat that is too high, and the beads can be efficiently molded into the desired shape and cooled within commercially reasonable parameters. The resulting device or utensil includes no chemicals, no artificial sweeteners. The device may be formed into nearly any shape comprising dimensions, thicknesses, and resistance to tearing appropriate to meet safety standards for the intended devices.

The process, generally, comprises mixing the powders together, adding the flavor oil or oils with stirring to dissolve the powders. Next, the plastic is added and the mixture is heated and mixed together simultaneously. Mixing may be achieved by, for example, a tumbling dryer (or, in some embodiments, a ribbon blender) which provides simultaneous heating and mixing. One method comprises mixing beads and flavor in a bag (or covered pails or other containers that may be closed and subjected to tumbling and heat as described; then, inserting the bag into a tumble dryer until beads soften and flavor is infused. There are other means or combinations of means that can also be employed to achieve this effect. Alternatively, the mixture can be made in drums that are heated and rolled until the beads have been infused and/or coated with the flavor mixture and are, once again, free flowing without clumping. Thereafter, this flavored plastic is injection molded at comparatively low temperatures. For example, a temperature of between about 200 F and about 400 F, more preferably between about 250 F and 300 F, and often a maximum processing temperature of about 350 F, is often successfully employed to soften the plastic and mold it into the desired implement, toy, or device. The resulting item is flavored, child-safe, durable, and exhibits taste for about 6 months and up to 2 years or more.

What I claim is:

1. A method of constructing at least one of eating utensils, drinking straws, teething devices, toys, and cups from an infused plastic said method comprising:
    at least one of infusing and coating non-toxic plastic beads with a non-artificial mixture comprising at least one of fruit oil, a flavoring powder, and an amount of sugarless non-artificial sweetener to form a plurality of flavor infused non-toxic plastic beads; and
    shaping the plurality of flavor infused non-toxic plastic beads into at least one of the eating utensils, drinking straws, teething devices, toys, and cups, wherein the non-artificial mixture comprises about 4 parts of the flavoring powder to about 16 parts fruit oil to between about 1 and about 2 parts of a powdered drink mix to 100 plastic beads.

2. The method of claim 1, wherein the at least one of infusing and coating the non-toxic plastic beads with the non-artificial mixture includes tumbling the beads and the non-artificial mixture together, with heat less than 177 degrees Celsius, to provide time and contact necessary to allow a portion of the non-artificial mixture to coat and at least partially infuse into the plastic beads.

3. The method of claim 1, wherein the non-toxic plastic beads comprise EVA (ethylene vinyl acetate).

4. A toy made by the method of claim 1.

5. The method of claim 1, wherein shaping the plurality of flavor infused non-toxic plastic beads into at least one of the eating utensils, drinking straws, teething devices, toys, and cups includes at least one of injection molding, structural foam molding, sheet and shape extrusion, blow molding, and wire coating.

* * * * *